United States Patent
Deymier et al.

(10) Patent No.: US 11,398,213 B2
(45) Date of Patent: Jul. 26, 2022

(54) SOUND/ELASTIC-WAVE SYSTEMS WITH FERMIONIC QUANTUM-LIKE BEHAVIOR FOR PHASE-BASED ENCODING OF INFORMATION

(71) Applicant: Arizona Board of Regents on Behalf of the University of Arizona, Tucson, AZ (US)

(72) Inventors: Pierre A. Deymier, Tucson, AZ (US); Keith A. Runge, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 826 days.

(21) Appl. No.: 16/320,781

(22) PCT Filed: Jul. 26, 2017

(86) PCT No.: PCT/US2017/044025
§ 371 (c)(1),
(2) Date: Jan. 25, 2019

(87) PCT Pub. No.: WO2018/022801
PCT Pub. Date: Feb. 1, 2018

(65) Prior Publication Data
US 2019/0164531 A1    May 30, 2019

Related U.S. Application Data

(60) Provisional application No. 62/367,494, filed on Jul. 27, 2016.

(51) Int. Cl.
*G10K 11/168*     (2006.01)
*B82Y 10/00*      (2011.01)
*G06N 10/00*      (2022.01)
*E04B 1/84*       (2006.01)
*G10K 11/165*     (2006.01)
*G10K 11/26*      (2006.01)

(52) U.S. Cl.
CPC .......... *G10K 11/168* (2013.01); *B82Y 10/00* (2013.01); *E04B 1/84* (2013.01); *G06N 10/00* (2019.01); *G10K 11/165* (2013.01); *G10K 11/26* (2013.01); *E04B 2001/8457* (2013.01)

(58) Field of Classification Search
None
See application file for complete search history.

(56) References Cited

U.S. PATENT DOCUMENTS 8,504,497 B2   8/2013   Amin
8,525,544 B2   9/2013   Wu et al.
(Continued)

OTHER PUBLICATIONS

Deymier, P.A. & Runge, K. & Swinteck, Nichlas & Muralidharan, K.. (2014). Rotational modes in a phononic crystal with fermion-like behavior. Journal of Applied Physics. 115. 163510-163510. 10.1063/1.4872142 (Year: 2014).*

(Continued)

*Primary Examiner* — Alia Sabur
(74) *Attorney, Agent, or Firm* — Polsinelli PC (57) ABSTRACT

Embodiments for sound and elastic-wave systems with fermionic quantum-like behavior and in particular to an approach for the phase-based encoding of information are disclosed.

18 Claims, 3 Drawing Sheets

(56) References Cited

U.S. PATENT DOCUMENTS 8,581,227 B2 11/2013 Freedman et al.
2018/0090200 A1 3/2018 Soykal et al.

OTHER PUBLICATIONS

Aravantinos-Zafiris, Nikos & Sigalas, Michael & Kafesaki, M. & Economou, E. (2014). Phononic crystals and elastodynamics: Some relevant points. AIP Advances. 4. 10.1063/1.4904406 (Year: 2014).*
Robillard, J.-F & Bou Matar, Olivier & Vasseur, J. & Deymier, P. & Stippinger, M. & Hladky-Hennion, A.C. & Pennec, Y. & Djafari-Rouhani, B.. (2009). Tunable magnetoelastic phononic crystals. Applied Physics Letters. 95. 124104-124104. 10.1063/1.3236537 (Year: 2009).*
Written Opinion of the International Searching Authority in related Application No. PCT/US2017/044025, dated Nov. 7, 2017, 6 pages.
Search Report in related Application No. PCT/US2017/044025, published Feb. 1, 2018 (Publication No. WO2018/022801A1).
Deymier, et al., Rotational modes in a phononic crystal with fermion-like behavior, J. Appl. Phys. 115, 163510 2014.
Deymier, et al., Torsional topology and fermion-like behavior of elastic waves in phononic structures, Comptes Rendus de l'Academie des Sciences—Mecanique (2015), http://dx.doi.org/10.1016/j.crme.2015.07.003.
Dobrzynski, Interface response theory of composite systems, Surf. Sci. 200 (1988) 435.
Faust, et al., Coherent control of a classical nanomechanical two-level system, Nature Physics, 9, 485-488, (2013), [online] http://www.nature.com/nphys/journal/v9/n8/full/nphys2666.html.
Gump, et al., Light-induced giant softening of network glasses observed near the mean-field rigidity transition, Phys. Rev. Lett. 92 (2004) 245501.
Hasan, et al., Colloquium: topological insulators, Rev. Mod. Phys. 82 (2010) 3045.
Kane, et al., Topological boundary modes in isostatic lattices, Nat. Phys. 10 (2014) 39.
Khanikaev, et al., Photonic topological insulators, Nat. Mater. 12 (2013) 233.
Matar, et al., Band gap tunability of magneto-elastic phononic crystal, J. Appl. Phys. 111 (2012) 054901.
Okamoto, et al., Coherent phonon manipulation in coupled mechanical resonators, Nature Physics, 9, 480-484, (2013), [online] http://www.nature.com/nphys/journal/v9/n8/full/nphys2665.html.
Peng, et al., A lumped model for rotational modes in phononic crystals, Phys. Rev. B 86 (2012) 134304.
Pirkkalainen, et al., Hybrid circuit cavity quantum electrodynamics with a micromechanical resonator, Nature 494, 211-215, (Feb. 14, 2013) [online] http://go.galegroup.com.ezproxy1.library.arizona.edu/ps/i.do?p=ITOF&u=uarizona_main&id=GALE|A319614628&v=2.1&it=r&sid=summon&userGroup=uarizona_main&authCount=1.
Prodan, et al., Topological phonon modes and their role in dynamic instability of microtubules, Phys. Rev. Lett. 103 (2009) 248101.
Rechtsman, et al., Photonic Floquet topological insulators, Nature 496 (2013) 196.
Rubino, et al., Negative-frequency resonant radiation, Phys. Rev. Lett. 108 (2012) 253901.
Ruskov, et al., Coherent phonons as a new element of quantum computing and devices, Journal of Physics: Conference Series 398 (2012) 012011 [online].
Ruskov, et al., On-chip cavity quantum phonodynamics with an acceptor qubit in silicon, Physical Review B88, 064308 (2013) [online] http://journals.aps.org/prb/pdf/10.1103/PhysRevB.88.064308.
Schmidt, et al., Optomechanical circuits for nanomechanical continuous variable quantum state processing, 2012 New J. Phys. 14 125005 [online] http://iopscience.iop.org/article/10.1088/1367-2630/14/12/125005/pdf.
Soykal, et al., Sound-based analogue of cavity quantum electrodynamics in silicon, Laboratory for Physical Sciences (2013) [online].
Stannigel, et al., Optomechanical Quantum Information Processing with Photons and Phonons, Physical Review Lett. 109, 013603—Published Jul. 6, 2012 [online] ttp://journals.aps.org.ezproxy1.library.arizona.edu/prl/pdf/10.1103/PhysRevLett.109.013603.
Swinteck, et al., Sound with a twist: bulk elastic waves with unidirectional backscattering-immune topological states, J. Appl. Phys. (2015), submitted for publication.
Vasiliev, et al., A discrete model and analysis of one-dimensional deformations in a structural interface with micro-rotations, Mech. Res. Commun. 37 (2010) 225-229.
Vasiliev, et al., Multifield model for Cosserat media, J. Mech. Mater. 3 (2008) 1365-1382.
Wang, et al., Observation of unidirectional backscattering-immune topological electromagnetic states, Nature 461 (2009) 772.

* cited by examiner

SOUND/ELASTIC-WAVE SYSTEMS WITH FERMIONIC QUANTUM-LIKE BEHAVIOR FOR PHASE-BASED ENCODING OF INFORMATION

FIELD

The present disclosure generally relates to sound and elastic-wave systems with fermionic quantum-like behaviour and in particular to an approach for the phase-based encoding of information.

BACKGROUND

Wave functions possess a spinor and a spatio-temporal part. The spinor part leads to a non-conventional torsional topology of the wave function. In the long-wavelength limit, field theoretical methods can be used to demonstrate that rotational phonons can exhibit fermion-like behavior.

The understanding of elastic waves has been largely driven by the simple paradigm of the plane wave and its periodic counterpart (the Bloch wave) in periodic media. Significant progress has been achieved in unraveling the behavior of elastic waves in phononic crystals and acoustic metamaterials. However, most of this progress has been achieved through exploration of the geometrical complexity of these media. Inspired by the discovery of topological insulators for which the electronic wave function is supported in momentum space by manifolds with non-conventional topologies, recent studies have shown the possibility of achieving electromagnetic waves and acoustic waves with non-conventional topologies.

It is with these observations in mind, among others, that various aspects of the present disclosure were conceived and developed.

DETAILED DESCRIPTION

The present application investigates the properties of wave functions in phononic structures supporting rotational waves which can exhibit wave functions that take the form of spinors. The non-conventional torsional topology of the wave function of elastic waves with spinor characteristics leads to a constraint on the wave function reminiscent of the Pauli-exclusion principle. This type of constraint introduces the notion of fermion-like behavior of elastic waves. The presently discussed topological constraints on elastic waves can improve phononic systems, permitting unique, robust designs and new device functionalities by providing immunity to performance degradation caused by imperfections or information coding and processing in the phase of the waves.

Previous investigations have shed light on various properties a 2D phononic crystal (PC) constituted of stiff polymer inclusions in a soft elastomer matrix. The 2D PC composed of a square array of polystyrene (PS) inclusions in a polydimethylsiloxane (PDMS) elastomer matrix has been shown to be capable of supporting rotational waves. Of particular interest are modes where the PS inclusions and the region of the matrix separated by the inclusions rotate out of phase but also in phase. Following Peng et al., who demonstrated that a 1D lumped mass model could be used to describe rotational modes in a 2D PC, a 1D mass spring phononic structure that could also support rotational waves was introduced. This 1D model can be used to reproduce the dispersion relations of the 2D system in a certain range, and it can subsequently be shown within Dirac's formalism that the wave function for rotational waves possesses a spinor-part and a spatio-temporal part.

The present application discusses the geometric topology of the spinor-part of the wave function, and shows that the spinor-part imparts a non-conventional topology to the wave function. In particular, the spinor part of the elastic wave function is supported in momentum space by a manifold with torsional topology. Furthermore, in the long-wavelength limit of the 1D model, the concept of phononic structures that support rotational waves and the concept of a Dirac representation of elastic waves within a field theoretical framework are integrated with each other. This leads to the observation of fermion-like behavior resulting from the spinor part of the wave function. In particular, it is found that within the context of a "second quantization" of the rotational waves, the properties of their associated spinor lead to anticommutation rules for the creation and annihilation operators.

After showing the possibility of fermion-like constraints on the elastic waves, a second question related to the more practical aspect of this behavior is also posed: what are the implications of fermion-like phonon behavior? A partial answer to that question is provided by introducing the concept of phase control of phonons through the specificity of their fermion character. To that effect, the concept of a phononic structure-based ψ(phase)-bit is introduced, and it is demonstrated that one can operate on the ψ-bit through the structure's physical parameters to transform the spinor state of the wave function. More specifically, one can operate on and measure the spinor state of phonons replicating known operations that are more commonly executed on fermions states like spins.

The 1D discrete mass-spring model that supports rotational modes forms the foundation of a field theoretical representation of rotational modes in phononic structures. The wave equation associated with that model is shown to be isomorphic to the Klein Gordon equation, and that equation is therefore factored using Dirac formalism to obtain the wave functions and investigate their non-conventional topology in momentum (k) space. Quantum field theoretic methodologies are used to analyze the properties of the wave functions in the long-wavelength limit and find constraints on the wave function reminiscent of fermion-like behavior. An application of these findings to the encoding and processing of information in the wave function is disclosed.

Nonconventional Topology of Rotational Waves in Phononic Crystals

One-Dimensional Discrete Micromechanics Model

The various embodiments makes use of a 1D mass-spring model that is known to reproduce the dispersion relations of a 2D phonon crystal that supports rotational waves. This model is based on a discrete linear one-dimensional micromechanics model that includes longitudinal, shear and rotational degrees of freedom. This 1D discrete lattice model comprises an infinite chain of square block elements connected with multiple harmonic springs. Each element in the model is considered to have two translational degrees of freedom (displacement in the x and y directions) and one rotational degree of freedom (rotation about an axis perpendicular to the xy-plane).

Figure 1:
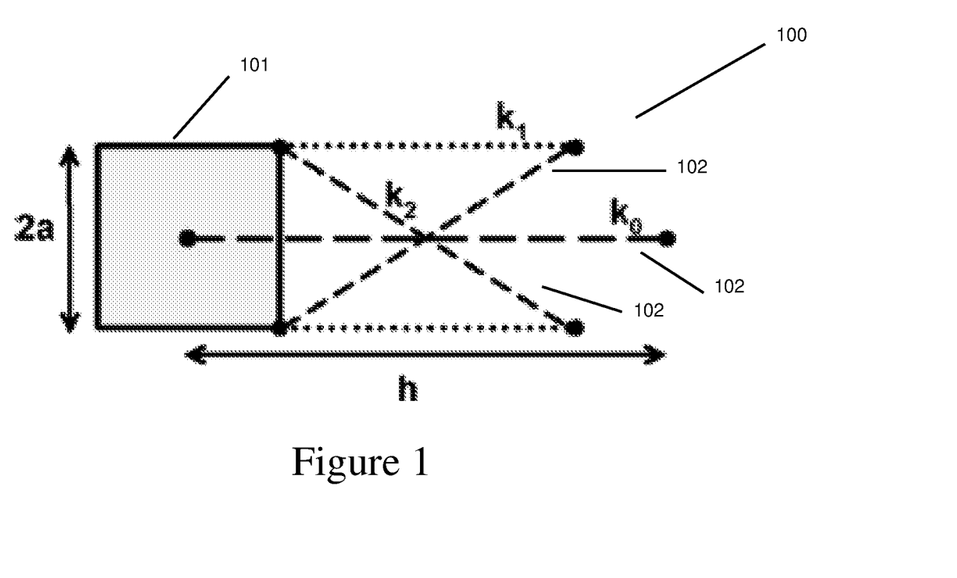
FIG. 1 depicts a schematic illustration of a discrete micromechanics model that supports rotational waves.

FIG. 1 depicts the repeatable unit cells for a monoblock lattice model 100 with periodicity (h). More specifically, FIG. 1 is a schematic illustration of a discrete micromechanics model that supports rotational waves. Three different harmonic springs (spring constants $k_0$, $k_1$, and $k_2$) connect different parts of the block elements 101. The element in FIG. 1 has mass (m) and moment of inertia (I). The block constituting the nth unit cell has x-displacement ($u_n$), y-displacement ($v_n$) and rotation component ($\varphi_n$). $u_n$ and $v_n$ represent displacements associated with longitudinal and transverse vibrations, respectively. The potential energy associated with the elastic connections 102 of elements (n) and (n+1) in the monoblock chain is written as follows:

$$E_{n,n+1} = \frac{1}{2}K_0(u_{n+1} - u_n)^2 + \tag{1}$$
$$\frac{1}{2}K_1\left[(v_{n+1} - v_n) + \frac{h}{2}(\varphi_{n+1} + \varphi_n)\right]^2 + \frac{1}{2}K_2(\varphi_{n+1} - \varphi_n)^2$$

where $$K_0 = \left(\frac{k_0}{h^2} + \frac{2k_1}{l^2} + \frac{2k_2 l^2}{l_e^4}\right), K_1 = \left(\frac{2k_2(2a)^2}{l_e^4}\right),$$
$$K_2 = \left(\frac{2a^2 k_1}{l^2}\right), l = h - (2a), l^d = \sqrt{(l^2 + (2a)^2)}.$$

Accordingly, the equations of motion for the element in the nth unit cell of the monoblock lattice are written as:

$$m\frac{d^2 u_n}{dt^2} = K_0(u_{n+1} - 2u_n + u_{n-1}) \tag{2}$$

$$m\frac{d^2 v_n}{dt^2} = K_1(v_{n+1} - 2v_n + v_{n-1}) + \frac{hK_1}{2}(\varphi_{n+1} - \varphi_{n-1}) \tag{3}$$

$$I\frac{d^2 \varphi_n}{dt^2} = K_2(\varphi_{n+1} - 2\varphi_n + \varphi_{n-1}) + \tag{4}$$
$$\frac{hK_1}{2}(v_{n-1} - v_{n+1}) - \frac{h^2 K_1}{4}(\varphi_{n+1} + 2\varphi_n + \varphi_{n-1})$$

The band structure of such a lattice would contain three bands corresponding to the three degrees of freedom (u, v, $\varphi$). However, for the sake of simplicity, this model is presently restricted to the propagation of rotational waves by allowing only rotation of the blocks about their center of mass and by constraining shear and longitudinal displacements in the lattice. The equation of motion associated with the rotational degrees of freedom (equation (4)) then takes the simpler general form:

$$I\frac{\partial^2 \varphi_n}{\partial t^2} = K_1'(\varphi_{n+1} - 2\varphi_n + \varphi_{n-1}) - K_2'\varphi_n \tag{5}$$

where $$K_1' = K_2 - \frac{h^2 K_1}{4}, \text{ and } K_2' = h^2 K_1.$$

Dividing the equation by I yields the following rotational wave equation:

$$\frac{\partial^2 \varphi_n}{\partial t^2} - \beta^2(\varphi_{n+1} - 2\varphi_n + \varphi_{n-1}) + \alpha^2 \varphi_n = 0 \tag{6}$$

with $$\beta^2 = \frac{K_1'}{I} \text{ and } \alpha^2 = \frac{K_2'}{I}.$$

Equation (6) takes the form of the discrete Klein-Gordon equation. Equation (6) involves the second derivatives with respect to continuous time and the discrete second derivative with respect to position of the angular degree of freedom. Subsequently, following the approach of Dirac in linearizing the relativistic Klein-Gordon equation, a wave equation in terms of first order spatial and temporal derivatives can be derived by rewriting the Laplacian: $\Delta \varphi_n = \varphi_{n+1} - 2\varphi_n + \varphi_{n-1}$, in a "square root" form: $\Delta \varphi_n = D(D\varphi_n)$. This can be done exactly by introducing the following first order differential operator:

$$D = e_1 \Delta^+ + e_2 \Delta^- = \begin{pmatrix} 0 & 1 \\ 0 & 0 \end{pmatrix}\Delta^+ + \begin{pmatrix} 0 & 0 \\ 1 & 0 \end{pmatrix}\Delta^- \tag{7}$$

In equation (7), $\Delta^+ \varphi_n = \varphi_{n+1} - \varphi_n$ and $\Delta^- \varphi_n = \varphi_n - \varphi_{n-1}$ are the forward and backward finite differences acting now on a two-vector. The 2×2 matrices $e_1$ and $e_2$ satisfy the conditions $e_1 e_2 = e_2 e_2 = 0$ and $e_1 e_2 + e_2 e_1 = I$ with I representing the 2×2 identity matrix. This formalism permits the exact and formal definition of the "square root" of the discrete Laplacian.

The Dirac-like equation for rotational waves corresponding to case I, then takes the form:

$$\left[\sigma_x \otimes I \frac{\partial}{\partial t} + i\beta \sigma_y \otimes \{e_1 \Delta^+ + e_2 \Delta^-\} \pm i\alpha I \otimes I\right]\psi = 0 \tag{8}$$

where $\sigma_x$ and $\sigma_y$ are the 2×2 Pauli matrices $$\begin{pmatrix} 0 & 1 \\ 1 & 0 \end{pmatrix} \text{ and } \begin{pmatrix} 0 & -i \\ i & 0 \end{pmatrix},$$

respectively. The parameter $\alpha$ plays the role of mass in the relativistic Dirac equation. Applying the outer product $\otimes$ leads to 4×4 matrices and $\psi$ is a four-vector:

$$\begin{pmatrix} \psi_{1n} \\ \psi_{2n} \\ \psi_{3n} \\ \psi_{4n} \end{pmatrix}.$$

This four-component representation is the consequence of the discrete nature of the Laplacian. In contrast, with a continuous Laplacian, there is no distinction between forward and backward derivatives and only a two-component representation is needed. This is the case in the long-wavelength limit. In this limit, having a two-component spinor indicates that there is a coupling between waves propagating in opposite directions (positive or negative) along the chain of blocks.

When considering the short-wavelength four-component spinor solution, the first two components represent propagation of waves in the positive direction and the next two components propagation in the negative direction. The two components for the positive direction and the two components from the negative directions reflect a lifting of degeneracy due to asymmetry of the forward and backward finite different in the discrete Dirac equation. The solutions of equations (8) are automatically solutions of equation (6), but the converse is not true.

As will be seen later, the directions of propagation of the wave are expressed separately in the Dirac wave function. The ± in equation (8) corresponds to choices of the sign of the parameter $\alpha$ (i.e. choice of positive or negative "mass" in Dirac's formalism). First seeking solutions of equation (8) with the negative value, equation (8) becomes:

$$\left[C\frac{\partial}{\partial t} + \beta\{A\Delta^+ + B\Delta^-\} - i\alpha I\right]\psi = 0 \tag{9}$$

C, A, B, and I are the 4 matrices:

$$\begin{pmatrix} 0 & 0 & 1 & 0 \\ 0 & 0 & 0 & 1 \\ 1 & 0 & 0 & 0 \\ 0 & 1 & 0 & 0 \end{pmatrix}, \begin{pmatrix} 0 & 0 & 0 & 1 \\ 0 & 0 & 0 & 0 \\ 0 & -1 & 0 & 0 \\ 0 & 0 & 0 & 0 \end{pmatrix}, \begin{pmatrix} 0 & 0 & 0 & 0 \\ 0 & 0 & 1 & 0 \\ 0 & 0 & 0 & 0 \\ -1 & 0 & 0 & 0 \end{pmatrix}, \begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

It is easily verifiable that CC=1, AA=BB=0, AB+BA=−1, and C (AΔ⁺+BΔ⁻)+(AΔ⁺+BΔ⁻) C=0, which are the conditions necessary to recover the wave equation (6) by applying the operator in equation (9) twice (with appropriate ±sign). Equation (9) is the basis for a discussion of rotational waves with non-trivial topologies in phononic structures.

Seeking solutions in the form of plane $\psi_{jn}=a_j e^{-i\omega t} e^{iknh}$ with j=1, 2, 3, 4. $\omega$ and k are the angular frequency and wavenumber, respectively. Recalling that "h" is the spacing distance between blocks, equation (9) yields the system of equations:

$$\begin{cases} -i\alpha a_1 - i\omega a_3 + \beta(e^{ikh}-1)a_4 = 0 \\ -i\alpha a_2 + \beta(1-e^{-ikh})a_3 - i\omega a_4 = 0 \\ -i\omega a_1 - \beta(e^{ikh}-1)a_2 - i\alpha a_3 = 0 \\ -\beta(1-e^{-ikh})a_1 - i\omega a_2 - i\alpha a_4 = 0 \end{cases} \tag{10}$$

This system of equations admits two doubly degenerate eigenvalues:

$$\omega = \pm\sqrt{\alpha^2 - \beta^2(e^{ikh}-1)(1-e^{-ikh})} = \pm\sqrt{\alpha^2 + 4\beta^2\sin^2\frac{kh}{2}} \tag{11}$$

The negative frequency can be interpreted physically as follows. Since the angular field ought to be a real-valued quantity, it can be written as the sum of a complex term and its complex conjugate. The negative frequency is associated with the complex conjugate term. The rotational mode at the origin, k=0, has a finite frequency. Note that equation (11) gives two branches with positive and negative frequencies that do not intersect at the origin unless $\alpha=0$.

The dispersion relations are periodic and defined in the first Brillouin zone:

$$k \in \left[-\frac{\pi}{h}, \frac{\pi}{h}\right].$$

Choosing the positive or negative branches of the dispersion relations, the four eigenvectors can be determined:

$$\psi_1^\pm = \tag{12a}$$

$$\begin{pmatrix} a_1 \\ a_2 \\ a_3 \\ a_4 \end{pmatrix} e^{-i\omega t} e^{iknh} = a_0 \begin{pmatrix} ie^{+i\frac{kh}{4}}\left(\alpha - \beta(e^{i\frac{kh}{2}} - e^{-i\frac{kh}{2}})\right) \\ \mp e^{-i\frac{kh}{4}}\sqrt{\alpha^2 - \beta^2(e^{i\frac{kh}{2}} - e^{-i\frac{kh}{2}})^2} \\ \mp ie^{+i\frac{kh}{4}}\sqrt{\alpha^2 - \beta^2(e^{i\frac{kh}{2}} - e^{-i\frac{kh}{2}})^2} \\ e^{-i\frac{kh}{4}}\left(\alpha - \beta(e^{i\frac{kh}{2}} - e^{-i\frac{kh}{2}})\right) \end{pmatrix} e^{-i\omega t} e^{iknh}$$

$$\psi_2^\pm = \tag{12b}$$

$$\begin{pmatrix} a_1 \\ a_2 \\ a_3 \\ a_4 \end{pmatrix} e^{-i\omega t} e^{iknh} = a_0 \begin{pmatrix} -ie^{+i\frac{kh}{4}}\left(\alpha + \beta(e^{i\frac{kh}{2}} - e^{-i\frac{kh}{2}})\right) \\ \mp e^{-i\frac{kh}{4}}\sqrt{\alpha^2 - \beta^2(e^{i\frac{kh}{2}} - e^{-i\frac{kh}{2}})^2} \\ \pm ie^{+i\frac{kh}{4}}\sqrt{\alpha^2 - \beta^2(e^{i\frac{kh}{2}} - e^{-i\frac{kh}{2}})^2} \\ e^{-i\frac{kh}{4}}\left(\alpha + \beta(e^{i\frac{kh}{2}} - e^{-i\frac{kh}{2}})\right) \end{pmatrix} e^{-i\omega t} e^{iknh}$$

The upper signs in equations (12a) and (12b) correspond to the positive branch of the band structure ($\omega>0$) and the lower signs to the negative branch ($\omega>0$).

Similarly, the following equation can be solved:

$$\left[C\frac{\partial}{\partial t} + \beta\{A\Delta^+ + B\Delta^-\} + i\alpha I\right]\overline{\psi} = 0 \tag{13}$$

The operator in equation (13) is the complex conjugate of the operator in equation (9), so, seeking solutions in the form of plane waves, $\overline{\psi}_{jn}=\overline{\sigma}_j e^{j\omega t} e^{-iknh}$ with j=1, 2, 3, 4 yields the four eigenvectors:

$$\overline{\psi}_1^\pm = \qquad (14a)$$

$$\begin{pmatrix} \overline{a}_1 \\ \overline{a}_2 \\ \overline{a}_3 \\ \overline{a}_4 \end{pmatrix} e^{i\omega t} e^{-iknh} = a_0 \begin{pmatrix} ie^{-i\frac{kh}{4}}(\alpha - \beta(e^{i\frac{kh}{2}} - e^{-i\frac{kh}{2}})) \\ \mp e^{+i\frac{kh}{4}}\sqrt{\alpha^2 - \beta^2(e^{i\frac{kh}{2}} - e^{-i\frac{kh}{2}})^2} \\ \mp ie^{-i\frac{kh}{4}}\sqrt{\alpha^2 - \beta^2(e^{i\frac{kh}{2}} - e^{-i\frac{kh}{2}})^2} \\ e^{+i\frac{kh}{4}}(\alpha - \beta(e^{i\frac{kh}{2}} - e^{-i\frac{kh}{2}})) \end{pmatrix} e^{i\omega t} e^{-iknh}$$

$$\overline{\psi}_2^\pm = \qquad (14b)$$

$$\begin{pmatrix} \overline{a}_1 \\ \overline{a}_2 \\ \overline{a}_3 \\ \overline{a}_4 \end{pmatrix} e^{i\omega t} e^{-iknh} = a_0 \begin{pmatrix} -ie^{-i\frac{kh}{4}}(\alpha + \beta(e^{i\frac{kh}{2}} - e^{-i\frac{kh}{2}})) \\ \mp e^{+i\frac{kh}{4}}\sqrt{\alpha^2 - \beta^2(e^{i\frac{kh}{2}} - e^{-i\frac{kh}{2}})^2} \\ \pm ie^{-i\frac{kh}{4}}\sqrt{\alpha^2 - \beta^2(e^{i\frac{kh}{2}} - e^{-i\frac{kh}{2}})^2} \\ e^{+i\frac{kh}{4}}(\alpha + \beta(e^{i\frac{kh}{2}} - e^{-i\frac{kh}{2}})) \end{pmatrix} e^{i\omega t} e^{-iknh}$$

Non-Conventional Topology of Rotational Waves

Turning to an investigation of the topology in k space of the solutions given by equations (12a), (12b) and (14a), (14b), it is easy to show the following relations:

$$\psi_{1,2}^\pm\left(k + \frac{2\pi}{h}\right) = e^{-i\frac{\pi}{2}}\overline{\psi}_{1,2}^{*\pm}(k) \qquad (15a)$$

$$\psi_{1,2}^\pm\left(k + \frac{4\pi}{h}\right) = e^{-i\pi}\psi_{1,2}^\pm(k) \qquad (15b)$$

$$\psi_{1,2}^\pm\left(k + \frac{6\pi}{h}\right) = e^{-i\frac{3\pi}{2}}\overline{\psi}_{1,2}^{*\pm}(k) \qquad (15c)$$

$$\psi_{1,2}^\pm\left(k + \frac{8\pi}{h}\right) = e^{-i2\pi}\psi_{1,2}^\pm(k) \qquad (15d)$$

In equations (15a)(15d), the * symbol represents the complex conjugate. $\psi$ and $\overline{\psi}$ are orthogonal and satisfy: $\overline{\psi}\psi=0$. The relations given by equation (15) indicate that the wave function has a periodicity of $$\frac{8\pi}{h}..$$

The topology of the wave function is more easily illustrated by considering the parallel transport of two orthogonal vector fields along a closed loop corresponding to $$k \in \left[0, \frac{8\pi}{h}\right]..$$

Figure 2:
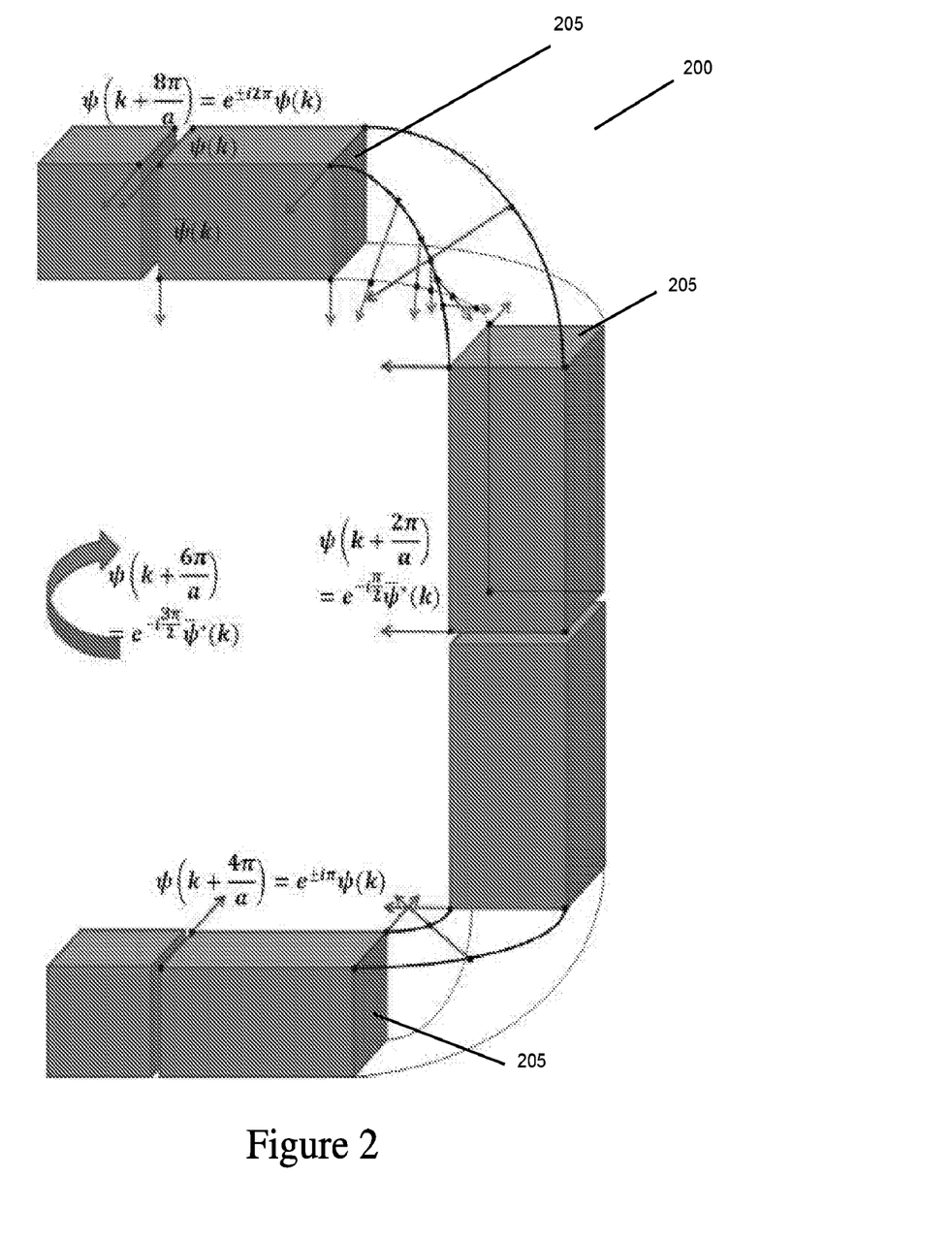
FIG. 2 depicts a schematic illustration of the torsional topology of the wave function for rotational modes in k space.

The first vector field represents the wave function $\psi$ and the second vector field the complex conjugate of $\overline{\psi}$. This non-conventional torsional topology is illustrated in FIG. 2 in the form of a torus 200 with a square cross section 205 that exhibits four 90° twists.

Starting at the top of the figure, the red arrow and green arrow represent the two orthogonal wave functions $\psi$ and $\overline{\psi}$ respectively. The red arrow points in a direction perpendicular to the plane of the figure and the green arrow points in a direction within the plane of the figure. As the vector fields are transported along the first twist, the green arrow is now pointing in the plane of the figure and the green arrow becomes perpendicular to that plane, that is $\psi$ turns into $\overline{\psi}$.

The red arrow transported through the first twist now makes a right angle with the red arrow at the starting point. This means that the wave function $\psi$ has accumulated a phase of $$\frac{-\pi}{2}.$$

The process is repeated through the second twist. The red arrow transported through the second twist is now parallel to the red arrow at the origin but is pointing in the opposite direction and satisfies the condition:

$$\psi\left(k + \frac{4\pi}{h}\right) = -\overline{\psi}(k).$$

This means that the wave function $\psi$ has accumulated a phase of $-\pi$. The vector fields can be transported through the third and fourth twists (not illustrated in the figure) to close the loop in k space and reach the starting point. At that point:

$$\psi\left(k + \frac{8\pi}{h}\right) = \psi(k).$$

The torsional topology of the wave function results from its spinor characteristics that endow it with fermion-like character. This character is analyzed in further detail below. To simplify the mathematics, only the long-wavelength limit is considered.

Analysis of Fermion-Like Behavior in the Long-Wavelength Limit

Dirac Equation in the Long-Wavelength Limit

In the long-wavelength limit, k→0, equation (6) reduces to $$\frac{\partial^2 \varphi}{\partial t^2} - \beta^2 \frac{\partial^2 \varphi}{\partial x^2} + \alpha^2 \varphi = 0 \qquad (16)$$

Figure 3:
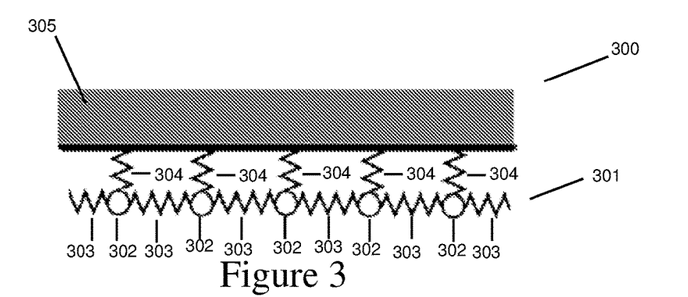
FIG. 3 depicts a mass-spring system isomorphic to a block-spring system supporting rotational waves only.

Note that equation (16) is also that of a system composed of a one-dimensional harmonic chain 301 composed of masses 302 ($m$) connected to their nearest neighbors by springs 303 with spring constant $k_1$ and connected to a rigid substrate by springs 304 which constant is $k_2$ (see FIG. 3). The relation between the equation of this spring-mass system 300 and the rotational wave equation (16) is obtained by setting $\alpha^2\kappa_2/m$ and $\beta^2=\kappa_1/m$. In the long-wavelength limit, this is a system composed of a string embedded in an elastic medium. The isomorphism between the block-spring system and the mass-spring model will be used in subsequent calculations.

Equation (16) admits plane wave solutions with eigenvalues given by $\omega=\pm\sqrt{\alpha^2+\beta^2(kh)^2}$. At k=0, the eigenmode with frequency $\omega=\alpha$ correspond to point B in FIG. 2. Note that to obtain the dispersion relation, equation (16) was solved by assuming plane wave solutions. These solutions correspond to traveling waves. However, the dispersion relation indicates that, for instance, at k=0 the group velocity is zero, that is the eigenvector solution to (16) is a standing wave. Since a standing wave is the superposition of two waves traveling in opposite directions, equation (16) is unable to reveal the standing wave character of its solutions. Furthermore, the amplitude of the two oppositely traveling waves forming a standing wave have to be the same. Equation (16) does not impose any constraint on the amplitude of its plane wave solutions. For k≠0, the group velocity approaches the phase velocity only when k→∞, the solutions of equation (16) have mixed standing and traveling wave character. These solutions ought to be the superposition of waves traveling in opposite directions, whose amplitudes are not independent of each other, but are wavenumber dependent. It is these very observations that make the factorization of equation (16) into direction-specific equations necessary.

Equation (16) is isomorphic to the continuous relativistic Klein-Gordon equation. Here, again, following the approach of Dirac in linearizing the relativistic Klein Gordon equation, the goal is to derive a wave equation in terms of first order spatial and temporal derivatives:

$$\left[\sigma_X \frac{\partial}{\partial t} + i\beta\sigma_Y \frac{\partial}{\partial x} - i\alpha I\right]\psi = 0 \quad (17a)$$

$$\left[\sigma_X \frac{\partial}{\partial t} + i\beta\sigma_Y \frac{\partial}{\partial x} - i\alpha I\right]\bar{\psi} = 0 \quad (17b)$$

where $\sigma_X$ and $\sigma_Y$ are the 2×2 Pauli matrices and I is the 2×2 identity matrix.

Note that these equations are not self-dual. Taking the complex conjugate of equation (17a) results in equation (17b), indeed the first two terms are real and only the last term changes sign. In particular, this results from the negative sign of the second term in the Klein-Gordon equation (16), which involves the multiplicative imaginary number "I" in the second term of the Dirac-like equations (17a), (17b).

$$L\left(\bar{\psi}, \frac{\partial\bar{\psi}}{\partial t}, \frac{\partial\bar{\psi}}{\partial x}\right) = \frac{\partial\bar{\psi}}{\partial t}\sigma_x\psi + i\beta\frac{\partial\bar{\psi}}{\partial X}\sigma_y\psi + i\alpha\bar{\psi}I\psi \quad (18a)$$

In equation (18a), $\bar{\psi}$ is the Hermitian conjugate of $\psi$. The Lagrangian (18a) is Hermitian and its conjugate is given by:

$$\bar{L}\left(\psi, \frac{\partial\psi}{\partial t}, \frac{\partial\psi}{\partial x}\right) = \bar{\psi}\sigma_x\frac{\partial\psi}{\partial t} + i\beta\bar{\psi}\sigma_y\frac{\partial\psi}{\partial X} - i\alpha\psi I\bar{\psi} \quad (18b)$$

The Lagrange's equation motion for the field variables $\psi$ is given by:

$$\frac{\partial}{\partial t}\left(\frac{\partial L}{\partial(\partial_t(\bar{\psi}))}\right) + \frac{\partial}{\partial x}\left(\frac{\partial L}{\partial(\partial_x(\bar{\psi}))}\right) - \frac{\partial L}{\partial_x(\bar{\psi})} = 0 \quad (19)$$

An equation of motion for the field $\bar{\psi}$ can also be obtain from equation (19) by replacing L by $\bar{L}$ and $\bar{\psi}$ by $\psi$. Using this approach, it is straightforward to recover equations (17a) and (17b).

Solutions of the Long-Wavelength Dirac Equation

Having established the Dirac equation and its Hermitian conjugate (17a), (17b), it is expected that there exist solutions in the form of plane waves, and since these are matrix equations, there exists a solution that contains a spinor part (i.e. a two by one part matrix). The solutions may therefore be written to be presented in the form:

$$\psi_k = \psi(k,\omega_k) = c_0\xi_k e^{(\pm)i\omega_k t}e^{(\pm)ikx} \text{ and}$$

$$\bar{\psi}_k = \psi(k,\omega_k) = c_0\bar{\xi}_k e^{(\pm)i\omega_k t}e^{(\pm)ikx}$$

where $\xi_k$ and $\bar{\xi}_k$ are two by one spinors. Inserting the various forms for these solutions in equations (17a), (17b) lead to the same eigenvalues that were obtained with the Klein-Gordon equation, namely: $\omega = \pm\sqrt{\alpha^2 + \beta^2(kh)^2}$. The spinor part the solutions for the different plane waves is summarized in Table 1.

TABLE 1

Two by one spinor solutions of equations (17a) and (17b) for the different plane waveforms.

| | $e^{+ikx}e^{+i\omega_k t}$ | $e^{-ikx}e^{+i\omega_k t}$ | $e^{+ikx}e^{+i\omega_k t}$ | $e^{-ikx}e^{+i\omega_k t}$ |
|---|---|---|---|---|
| $\xi_k$ | $\begin{pmatrix}\sqrt{\omega+\beta\text{kh}}\\\sqrt{\omega-\beta\text{kh}}\end{pmatrix}$ | $\begin{pmatrix}\sqrt{\omega-\beta\text{kh}}\\\sqrt{\omega+\beta\text{kh}}\end{pmatrix}$ | $\begin{pmatrix}-\sqrt{\omega-\beta\text{kh}}\\\sqrt{\omega+\beta\text{kh}}\end{pmatrix}$ | $\begin{pmatrix}-\sqrt{\omega+\beta\text{kh}}\\\sqrt{\omega-\beta\text{kh}}\end{pmatrix}$ |
| $\bar{\xi}_k$ | $\begin{pmatrix}\sqrt{\omega-\beta\text{kh}}\\-\sqrt{\omega+\beta\text{kh}}\end{pmatrix}$ | $\begin{pmatrix}\sqrt{\omega+\beta\text{kh}}\\-\sqrt{\omega-\beta\text{kh}}\end{pmatrix}$ | $\begin{pmatrix}\sqrt{\omega+\beta\text{kh}}\\\sqrt{\omega-\beta\text{kh}}\end{pmatrix}$ | $\begin{pmatrix}\sqrt{\omega-\beta\text{kh}}\\\sqrt{\omega+\beta\text{kh}}\end{pmatrix}$ |

Then $\bar{\psi}=\psi$. $S_D$ while $\psi$ is a solution of equation (17a), its complex conjugate is not a solution to (17a). $\bar{\psi}$ is solution to equation (17b). In the language of Quantum Field Theory, $\psi$ and $\bar{\psi}$ represent two different physical entitles, namely "particles" and "antiparticles."

3.2 Lagrangian Formalism

The Dirac-like equation (17a) derived in the previous section can be obtained from the Lagrangian:

The spinors in Table 1 are given to within any complex constant $c_0$.

Note that the wave functions $\bar{\psi}$ $\psi$ will eventually be promoted to the rank of creation and annihilation operators. Additionally, if $\alpha=0$, equation (17a) becomes $$\left[\sigma_x\frac{\partial}{\partial t} + i\beta\sigma_y\frac{\partial}{\partial x}\right]\psi = 0.$$

Using a plane wave solution with $$\xi_k(k, \omega_k) = \begin{pmatrix} \alpha_1 \\ \alpha_2 \end{pmatrix},$$

this equation reduces to the system:

$$\begin{cases} (\omega - \beta kh)\alpha_1 = 0 \\ (\omega + \beta kh)\alpha_2 = 0 \end{cases}.$$

Two solutions can be obtained for the angular velocity of the plane wave $\omega=\pm\beta kh$. These correspond to plane waves propagating in the positive and negative directions. In this case, the components of the two-spinor, $a_1$ and $a_2$ are now independent of each other and independent of the wavenumber. The amplitude of the plane wave propagating in the positive direction is independent of that of the wave propagating in the opposite direction. When $\alpha \neq 0$, from Table 1, the components of the two-spinor are not independent of each other. This indicates that the directions of propagation are not independent of each other anymore. It is the parameter $\alpha$ that couples those directions.

Energy and Anticommutation

The Hamiltonian density associated with the Lagrangian, $\mathcal{L}$. It is given by the Legendre transformation:

$$\overline{H} = \Pi \frac{\partial \psi}{\partial t} - \overline{L} \quad (20)$$

Where the momentum conjugate:

$$\Pi = \frac{\partial \overline{L}}{\partial (\partial \psi / \partial t)} = \overline{\psi}\sigma_x.$$

Inserting this expression in Equation (20) and using equation (18b), yields the Hamiltonian density:

$$\overline{H} = \overline{\psi}\sigma_x \frac{\partial \psi}{\partial t} \quad (21)$$

As mentioned previously, the quantity $\psi$ is now promoted to an operator (using the same symbol $\psi$ to represent the operator) and a representation is used whereby the field $\psi$ is expanded into plane waves and their complex conjugate:

$$\psi(x) = \sum_k \frac{1}{\sqrt{2\omega}} [a_k \xi_k e^{ikx} e^{-i\omega t} + a_k^* \xi_k^* e^{-ikx} e^{i\omega t}] \quad (22)$$

Similarly, the Hermitian conjugate of the $\psi$ operator can be written:

$$\overline{\psi}(x) = \sum_k \frac{1}{\sqrt{2\omega}} [\overline{a}_k \overline{\xi}_k e^{-ikx} e^{i\omega t} + \overline{a}_k^* \overline{\xi}_k^* e^{ikx} e^{-i\omega t}] \quad (23)$$

The quantities $\overline{a}_k$, $\overline{a}_k^k$, $a_k$, and $a_k^k$ are creation and annihilation operators, respectively. Inserting equations (22) and (23) into equation (21) and integrating over all space results in:

$$E = \int dx \overline{H} = \quad (24)$$

$$\sum_k \sum_{k'} \frac{\overline{a}_{k'}}{\sqrt{2\omega'}} (-i\omega) \overline{\xi}_{k'} \sigma_x \xi_k \frac{a_k}{\sqrt{2\omega}} e^{-i(\omega-\omega')t} \int dx e^{-i(k'-k)x} +$$

$$\sum_k \sum_{k'} \frac{\overline{a}_{k'}}{\sqrt{2\omega'}} (i\omega) \overline{\xi}_{k'} \sigma_x \xi_k^* \frac{a_k^*}{\sqrt{2\omega}} e^{i(\omega+\omega')t} \int dx e^{-i(k'+k)x} +$$

$$\sum_k \sum_{k'} \frac{\overline{a}_{k'}^*}{\sqrt{2\omega'}} (-i\omega) \overline{\xi}_{k'}^* \sigma_x \xi_k \frac{a_k}{\sqrt{2\omega}} e^{-i(\omega+\omega')t} \int dx e^{i(k'+k)x} +$$

$$\sum_k \sum_{k'} \frac{\overline{a}_{k'}^*}{\sqrt{2\omega'}} (i\omega) \overline{\xi}_{k'}^* \sigma_x \xi_k^* \frac{a_k^*}{\sqrt{2\omega}} e^{-i(\omega'-\omega)t} \int dx e^{-i(k-k')x}$$

The spatial integrals in equation (24) can be replaced by their respective delta functions, $\delta_{k',k}$, $\delta_{k',-k}$. Using Table 1, it can be shown that $\overline{\xi}_k \sigma_x \xi_k = \overline{\xi}_k^* \sigma_x \xi_k^* = 2\omega c_0^2$ and it can be shown that $\overline{\xi}_{-k} \sigma_x \xi_k^* = \overline{\xi}_{-k} \sigma_x \xi_k = 0$. Taking the constant $c_0^2 = -i$ to obtain an energy in the form of a real number, the energy of the system becomes:

$$E = \sum_k \omega(\overline{a}_k a_k - \overline{a}_k^* a_k^*) \quad (25)$$

To avoid the negative contribution to the energy in equation (25) and following the methods of quantum field theory, anticommutation rules need to be imposed on the creation and annihilation operators. That is:

$$[a_k, \sigma_\kappa] = \overline{a}_k a_\kappa + a_\kappa \overline{a}_k = \delta_{k,\kappa}$$

With these anticommutation rules, the energy takes the form $$E - E_0 = \sum_k \omega(\overline{a}_k a_k + a_k^* \overline{a}_k^*) \quad (27)$$

In equation (27), the terms that arise from the delta function of equation (26) have been lumped into a negative zero-point energy $E_0 = -\Sigma_k \omega(k)$.

The anticommutation rules given by equation (26) also imply that $\overline{a}_k k \overline{a}_k = 0$. This is Pauli's Exclusion Principle, which states that more than one particle per state cannot be created. The anticommutation rules indicate that the rotational modes have fermion character. A physical interpretation of these anticommutation rules suggests that the fields given by (22) and (23) are composed of forward and backward traveling waves whose relative amplitudes are determined solely by the spinor part of the wave function $\xi_k e^{ikx} e^{-i\omega t}$. Attempting to add an additional traveling component to one of the quasi-standing solutions via the operator $a_k^* \overline{a}_k^*$ would create a new state that could not be a solution of the Dirac equations (17a), (17b). Such a state is not allowed. This restriction provides a physical interpretation of Pauli's Exclusion Principle.

Number Operators

It was shown above that the energy is an invariant. This invariant is the consequence of the time reversal symmetry of equations (17a) and (17b). There exist other symmetries. In particular the Dirac-like equations are invariant upon the transformation involving a phase shift. Consequently, it can be shown that the number operator:

$$N = \int dx \bar{\psi} \sigma_x \psi$$

is also an invariant. Starting from the field operator given by equation (22), k can be replaced by −k in the second term of the summation. This leads to:

$$\psi(x) = \sum_k \frac{1}{\sqrt{2\omega}} [a_k \xi_k e^{ikx} e^{-i\omega t} + a^*_{-k} \xi^*_{-k} e^{ikx} e^{-i\omega t}] = \qquad (29)$$

$$\sum_k \frac{1}{\sqrt{2\omega}} [a_k \xi_k e^{ikx} e^{-i\omega t} + b_k \eta_k e^{ikx} e^{i\omega t}]$$

Similarly, the following field can be written:

$$\bar{\psi}(x) = \sum_k \frac{1}{\sqrt{2\omega}} [\bar{a}_k \bar{\xi}_k e^{-ikx} e^{i\omega t} + \bar{a}^*_{-k} \bar{\xi}^*_{-k} e^{-ikx} e^{-i\omega t}] = \qquad (30)$$

$$\sum_k \frac{1}{\sqrt{2\omega}} [\bar{a}_k \bar{\xi}_k e^{-ikx} e^{i\omega t} + \bar{b}_k \bar{\eta}_k e^{-ikx} e^{-i\omega t}]$$

Inserting equations (29) and (30) into (28), and following the same approach as before, yields:

$$N = \sum_k \frac{1}{2\omega} (\bar{a}_k a_k \bar{\xi}_k \sigma_x \xi_k + \bar{b}_k b_k \bar{\eta}_k \sigma_x \eta_k) \qquad (31)$$

Using Table 1 for the spinors and their Hermitian conjugate yields:

$$N = \sum_k (\bar{a}_k a_k + \bar{b}_k b_k) \qquad (32)$$

This is clearly an invariant. The operator $\bar{a}_k a_k$ count the number of waves propagating in a given direction and $\bar{b}_k b_k$ correspond to the number of waves propagating in the opposite direction. Considering a field representation that includes only one type of plane wave and therefore, looking at the first term of equation (32), provides a definition for the operator:

$$N_k = \frac{1}{2\omega} \bar{a}_k a_k \bar{\xi}_k \sigma_x \xi_k \qquad (33)$$

Recalling that $\bar{\xi}_k \sigma_k \xi_k = 2\omega = \omega + \beta k h + \omega − \beta k h$. the spinors can be renormalized with respect to the arbitrary complex constant $c_0$. The last equality suggests the introduction of direction switching operators $$S_+ = \frac{1}{2}(\sigma_x + i\sigma_y) = \begin{pmatrix} 0 & 1 \\ 0 & 0 \end{pmatrix} \text{ and } S_- = \frac{1}{2}(\sigma_x - i\sigma_y) = \begin{pmatrix} 0 & 0 \\ 1 & 0 \end{pmatrix}.$$

These operators anticommute: $S_+ S_- + S_- S_+ = I$. Using this later relation permits equation (33) to be reformulated in the form:

$$N_k = \frac{1}{2\omega} \bar{a}_k a_k \bar{\xi}_k I \sigma_x \xi_k = \bar{a}_k a_k \bar{\xi}_k \left( \frac{1}{2\omega} S_+ S_- \sigma_x + \frac{1}{2\omega} S_- S_+ \sigma_x \right) \xi_k \qquad (34)$$

The operator $$\frac{1}{2\omega} S_+ S_- \sigma_x$$

defines the occupancy of one of the directions along the chain of mass and springs. Its eigenvalues are given by $$n_k^+ = \bar{\xi}_k \frac{1}{2\omega} S_+ S_- \sigma_x \xi_k = \frac{\omega + \beta k h}{2\omega}.$$

The operator $$\frac{1}{2\omega} S_- S_+ \sigma_x$$

defines the occupancy of the other opposite direction. Its eigenvalues are given by:

$$n_k^- = \bar{\xi}_k \frac{1}{2\omega} S_- S_+ \sigma_x \xi_k = \frac{\omega - \beta k h}{2\omega}.$$

Considering the dispersion relation for the positive branch of the band structure, $\omega = +\sqrt{\alpha^2 + \beta^2 (kh)^2}$, the eigenvalues $n_k^+$ and $n_k^-$, can be rewritten in terms of the wave vector k only:

$$n_k^\pm = \frac{1}{2} \pm \frac{\beta k h / \alpha}{2\sqrt{1 + \left(\frac{\beta k h}{\alpha}\right)^2}} \qquad (35)$$

At the origin of the band structure, k=0, and $n_k^+ = n_k^- = \frac{1}{2}$. The direction occupancy is the same for the two opposite directions; hence the state of the system is described by a standing wave. For k→∞, $n_k^+ = 1$, and $n_k^- = 0$, the phononic structure supports a pure traveling wave with only one direction favored. For finite k, one has the superposition of traveling and standing waves. By spanning the dispersion relation, one spans the "direction" states. One can quantify the "amount" of traveling wave character of the wave function with the quantity: $(n_k^+ - n_k^-)$. When expressed as a function of frequency, this quantity takes the functional form:

$$(n_k^+ - n_k^-) = \frac{\sqrt{\omega^2 - \alpha^2}}{\omega}.$$

This clearly shows that the wave function character evolves from a pure standing wave at $\omega = \alpha$ to a pure traveling wave as the frequency increases to infinity.

The fermion-like behavior of the rotational wave opens up opportunities in the control of the direction of propagation of elastic waves. For instance, it has been shown that the two-spinor solution represents coupling between waves propagating in opposite directions. The spinor part of the wave function can be projected on the orthonormal basis $$\begin{pmatrix}1\\0\end{pmatrix} \text{ and } \begin{pmatrix}0\\1\end{pmatrix}$$

representing the possible directions of propagation of the wave. This enables information to be encoded in the relative weight (phase) of the directions of propagation by controlling the wavenumber, k. This control can enable applications in the field of information processing, as discussed below.

Applications to Information Processing

Phase Control (ψ)-Bit

Figure 4:
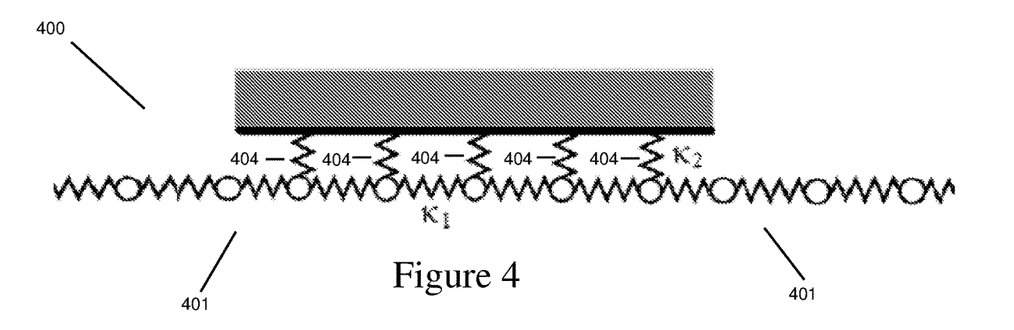
FIG. 4 depicts a schematic illustration of a device composite system comprising a segment of a mass-spring system with fermion-like behavior sandwiched between two semi-infinite harmonic chains.

The properties of rotational waves and their fermion-like behavior can be used to encode and process information, relying upon the isomorphism between the block-spring model and a mass-spring system (see FIG. 3) when considering a device that is composed of a segment of mass-spring system isomorphic to the block-spring system supporting the rotational waves sandwiched between two semi-infinite harmonic chains (FIG. 4).

The number of masses in the central region of the sandwich is denoted $N_c$. Assume that all the masses, m, have the same value, and that the spring constants of the semi-infinite regions 401 are the same as the mass-to-mass spring constant, $K_1$. The spring constant of the side springs 404 is $K_2$. Recall that these parameters map onto the parameters characterizing the rotational wave equation via the relations: $\alpha^2=K_2/m$ and $\beta^2=K_1/m$.

Of particular interest is the transmission of plane waves launched from the left semi-infinite chain through the fermion-like segment. For this, the transmission coefficient of the composite system 400 of FIG. 4 is calculated, employing the methods of the Interface Response Theory (IRT). The use of this method to calculate the transmission coefficient of infinite harmonic chains 401 perturbed with harmonic finite side chains 404 is known to those of ordinary skill in the art.

Figure 5:
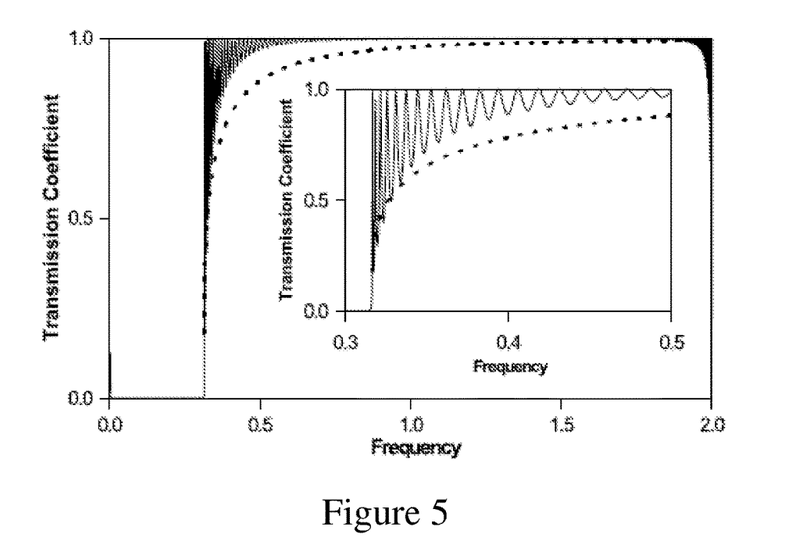
FIG. 5 depicts the coefficient of transmission of a plane wave launched in the right semi-infinite chain through the composite system of FIG. 4, with an inset depicting a magnified region around the bottom of the positive branch of the band structure.

FIG. 5 depicts the transmission coefficient as a function of frequency for a segment composed of $N_c=80$ masses with side springs, with m=1 and $K_1=1$, i.e. $\beta^2=1$. The side springs 404 have stiffness $K_2=0.1$, i.e. $\alpha=0.316$.

The transmission coefficient is zero for frequencies up to the value $\omega=\alpha=0.316$. This zero transmission corresponds to the gap in the band structure of the rotational waves. Waves that are launched and propagate in the right semi-infinite harmonic chain cannot propagate through the central segment of the composite. Inside the passing band of the central segment, transmission occurs. The oscillatory nature of the transmission coefficient is due to the finite size and the discrete nature of the central segment. The frequency equal to 2 corresponds to the upper frequency of waves that can be supported by a discrete one-dimensional harmonic chain. The decrease of the transmission coefficient as the frequency of 2 is approached results from the curvature (zero group velocity) of the band of the one-dimensional harmonic chain. Therefore, a one-to-one correspondence between the long-wavelength limit result (dotted line) and the transmission through a discrete system cannot be established.

However, the general trend of an increase in transmission as the frequency increases from the bottom of the passing band of the central segment structure is representative of both the discrete and long-wavelength limit fermion-like behavior. The most important observation is that a one-to-one correspondence between a measurable scalar quantity can be established: the transmission coefficient and the spinor characteristics of the wave that can be supported by the central segment of the composite.

For instance, for an incident wave $e^{ikx}e^{i\omega t}$ at $\omega=\alpha$ (k=0), the transmission coefficient is zero and the spinor part of the wave function takes on the form:

$$a\begin{pmatrix}1\\1\end{pmatrix}.$$

The components of the spinor vary monotonically as the frequency is increased (i.e. the wavenumber k is increased) until it takes a form approaching:

$$\sqrt{2\beta kh}\begin{pmatrix}1\\0\end{pmatrix}.$$

A similar tuning of the spinor part of the wave function can be achieved by fixing the frequency of the incident waves and varying the stiffness $\kappa_2$ (i.e. $\alpha$) of the side springs relative to the stiffness of the 1D harmonic chain. From a practical point of view, this could be achieved by using springs composed of an elastic material whose stiffness is dependent on the magnitude of an externally applied electromagnetic wave (e.g., materials exhibiting photo-elastic effects) or on an external magnetic field (e.g., a magneto-elastic medium).

Defining a basis set |0⟩ and |1⟩ whose matrix representation takes the form of $$\begin{pmatrix}1\\0\end{pmatrix} \text{ and } \begin{pmatrix}0\\1\end{pmatrix}$$

permits me creation of a superposition of state $u(\omega)|0\rangle+v(\omega)|1\rangle$ at fixed $\alpha$ or $u(\alpha)|0\rangle+v(\alpha)|1\rangle$ at fixed $\omega$. Note that launching the incident wave from the right-hand side of the composite harmonic chain corresponds to an incident wave with $\omega<0$. In that case, for instance for $\omega=\alpha$ (k=0), the spinor takes the value $$a\begin{pmatrix}-1\\1\end{pmatrix}.$$

This spinor is equivalent to the value $$a\begin{pmatrix}1\\-1\end{pmatrix}$$

to within a factor of −1. Therefore, for a given incident wave of frequency $\omega$, the operation of tuning $\alpha$ can be visualized between zero and $\omega=\alpha$ as that of a Hadamard transformation. As seen previously, the Hadamard transformation can then be physically achieved by modulating the strength of an external stimulus such as the magnitude of an external field. In its matrix representation, the Hadamard transformation takes the form $$\begin{pmatrix} 1 & 1 \\ 1 & -1 \end{pmatrix}$$

and transforms a wave launched from the left $$\begin{pmatrix} 1 \\ 0 \end{pmatrix}$$

into the standing wave, whose spinor is proportional to $$\begin{pmatrix} 1 \\ 1 \end{pmatrix}.$$

It also transforms a wave propagating from the right $$\begin{pmatrix} 0 \\ 1 \end{pmatrix}$$

into me standing wave whose spinor part is proportional to $$\begin{pmatrix} 1 \\ -1 \end{pmatrix}.$$

The action of applying the Hadamard gate a second time is equivalent to detuning the parameter $\alpha$ between from $\omega=\alpha$ to zero. This transforms the states $$\begin{pmatrix} 1 \\ 1 \end{pmatrix} \text{ and } \begin{pmatrix} 1 \\ -1 \end{pmatrix}$$

back into the traveling states $$\begin{pmatrix} 1 \\ 0 \end{pmatrix} \text{ and } \begin{pmatrix} 0 \\ 1 \end{pmatrix}.$$

This transformation can be detected easily through the change in transmission from zero to 1. The control of the relative magnitude and sign of the spinor components of the wave function enables the encoding of information in the phase of the superposition of states. A system like that of FIG. 4 is defined as a $\psi$(phase)-bit. The $\psi$-bit can be operated on through the system's physical parameter $\alpha$ via some external stimulus to transform the spinor state of the wave function. The Hadamard gate is an example of such an operation. The spinor state of the central segment of the $\psi$-bit can be determined by measuring a single scalar quantity, namely the transmission coefficient. The question that then arises is that of the encoding of information on multiple $\psi$-bits and the possibility of operating on them, addressed below.

Operations on Multiple $\psi$-Bits

Consider $\psi$-bits, i=1, 2, each prepared in the state: $|\xi_i\rangle = u(\alpha_i)|0\rangle + v(\alpha_i)|1\rangle$. The side springs in these two $\psi$-bits are again composed of material whose stiffness is dependent on some external stimulus. Two external stimuli are applied on each $\psi$-bits independently at this time. As seen in the previous section, this is achieved by launching a wave with frequency $\omega > \alpha_i$ to the right in each left semi-infinite chain. The transmission coefficient is measurable for each bit and takes on the value $T(\alpha_i)$. The two-bit system is in the initial product state: $|\xi_1\rangle \otimes |\xi_2\rangle$. One can now operate on this product state by defining a function $f(x)$ such that the product state becomes: $|\xi_1\rangle \otimes f(\xi_1) \oplus \xi_2)$. Because there is a one-to-one relation between $T(\alpha_1)$ and $|\xi_1\rangle$, this can be achieved by constructing a physical device that links the value of $\alpha_2$ (i.e., the magnitude of the external stimulus acting on the second $\psi$-bit) to that of the transmission coefficient of the first $\psi$-bit. For instance, one can define $\alpha_2(T(\alpha_1)) = f(T(\alpha_1))$. The new state of the second $\psi$-bit will therefore take the form $|\xi_2\rangle = u(\alpha_2(T(\alpha_1)))|0\rangle + v(\alpha_2(T(\alpha_1)))|1\rangle$. This procedure enables parallelism in the application of the operating function. This type of operation can be applied straightforwardly to a system of N $\psi$-bits, which could lead to parallel operations on the N-bit product state.

CONCLUSIONS

A 1D discrete block-spring model that supports rotational waves was investigated. This 1D discrete model was then analyzed within the Dirac's formalism to show that rotational waves are characterized by wave functions that include a spinor part and a spatio-temporal part. The spinor part is related to the coupling between the senses of wave propagation. The spatio-temporal part of the wave function retains its plane-wave character.

The topology of the wave function in k-space was also investigated to show that the wave function possesses a non-conventional torsional topology. The wave function is supported by a square cross section torus manifold exhibiting four 90° twists. This manifold has a periodicity of $$\frac{8\pi}{h},$$

where h is the periodicity of the 1D phononic structure.

The 1D system, in the long-wavelength limit, has been shown to exhibit fermion character. The fermion-like behavior of phonons discussed herein arises from the coupling between waves propagating along the positive and negative directions and from the projection of the wave function on the orthogonal space of direction of propagation. This fermion behavior is associated with constraints reminiscent of Pauli's Exclusion Principle. The present exclusion principle is a reflection of the exact nature of the eigenvectors of the wave equation projected on the space of directions. The eigenvectors of the phononic structures presented above are not simply plane waves but a superposition of plane waves traveling in opposite directions. These superposition states can be visualized as quasi-standing waves possessing a standing wave character and a traveling wave contribution. For a given wave vector, it is the fixed ratio of the amplitudes of the standing wave component and of the traveling wave components that constrains wave propagation and imposes an exclusion principle-type restriction. That is, an additional traveling wave cannot be superposed with the same wave vector without creating a new quasi-standing wave that is not solution of the wave equation.

One application of the properties of the wave function associated with its spinor character has been demonstrated. Encoding of information in the elastic waves that are supported by the phononic structures described above leads to the potential of operating simultaneously on the components of the spinor part of the wave functions. These operations act on the phase of states that can be written as superposition in a basis of pure forward or backward direction state and are called φ-bits. The present disclosure provides opportunities in operating on the states of multiple φ-bits. in a parallel fashion.

Finally, it is necessary to list some of the challenges that may be encountered in realizing experimentally a device that exhibits the fermion-like behavior described herein. These challenges are associated with (a) the difficulties in exciting rotational elastic waves, (b) difficulties in exciting only pure rotational modes without exciting other longitudinal or transverse modes, (c) loss resulting from the intrinsic viscoelastic properties of the media constituting the device, and (d) loss resulting from geometrical non-linearity associated with rotational degrees of freedom.

The invention claimed is:

1. A method for encoding information in a phononic structure, the method comprising:
providing a phononic structure having a fermion-like behavior and supporting elastic waves, the phononic structure describable by a wave function, wherein the wave function has a spinor part, the spinor part having one or more components; and
modifying the one or more components of the spinor part, wherein modifications of the components of the spinor part act on phase-bits, each phase-bit having a state comprising a superposition of waves propagating in a direction through the phononic structure;
wherein the state of the phase-bits is associated with information encoded therein.

2. The method of claim 1, wherein the waves only propagate in a pure forward direction and a pure backward direction.

3. The method of claim 1, wherein the phononic structure supports rotational waves characterized by wave functions including a spinor part and a spatio-temporal part.

4. The method of claim 1, wherein the phononic structure comprises springs, the springs comprising an elastic material.

5. The method of claim 4, wherein the elastic material has a stiffness, the stiffness dependent on the magnitude of an externally applied electromagnetic wave.

6. The method of claim 4, wherein the elastic material has a stiffness, the stiffness dependent on the magnitude of an external magnetic field.

7. A system for encoding information in a phononic structure, the system comprising:
a phononic structure having a fermion-like behavior and supporting elastic waves, the phononic structure describable by a wave function, wherein the wave function has a spinor part and the spinor part has one or more components; and
one or more phase-bits having a state comprising a superposition of waves propagating in a direction through the phononic structure, wherein operating on the components of the spinor part of the wave function acts on the acts on the state of the phase-bits;
wherein the state of the phase-bits is associated with information encoded therein.

8. The system of claim 7, wherein the waves only propagate in a pure forward direction and a pure backward direction.

9. The system of claim 7, wherein the phononic structure supports rotational waves characterized by wave functions including a spinor part and a spatio-temporal part.

10. The system of claim 7, wherein the phononic structure comprises springs comprising an elastic material.

11. The system of claim 10, wherein the elastic material exhibits photo-elastic effects.

12. The system of claim 10, wherein the elastic material exhibits magneto-elastic effects.

13. A system for encoding and operating on information in a phononic structure, the system comprising:
a phononic structure having a fermion-like behavior and supporting elastic waves, the phononic structure describable by a wave function, wherein the wave function has a spinor part and the spinor part has one or more components;
two or more phase-bits having a state comprising a superposition of waves propagating in a direction through the phononic structure, wherein operating on the components of the spinor part of the wave function acts on the state of the phase-bits, wherein the state of the phase-bits is associated with information encoded therein; and
a device linking a magnitude of an external stimulus on a second phase-bit to a transmission coefficient of a first phase-bit, wherein two external stimuli are applied on the first phase-bit and the second phase-bit simultaneously by launching a wave into the phononic structure.

14. The system of claim 13, wherein the waves only propagate in a pure forward direction and a pure backward direction.

15. The system of claim 13, wherein the phononic structure supports rotational waves characterized by wave functions including a spinor part and a spatio-temporal part.

16. The system of claim 13, wherein the phononic structure comprises springs comprising an elastic material.

17. The system of claim 16, wherein the elastic material exhibits photo-elastic effects.

18. The system of claim 16, wherein the elastic material exhibits magneto-elastic effects.

* * * * *